United States Patent Office 2,946,889
Patented July 26, 1960

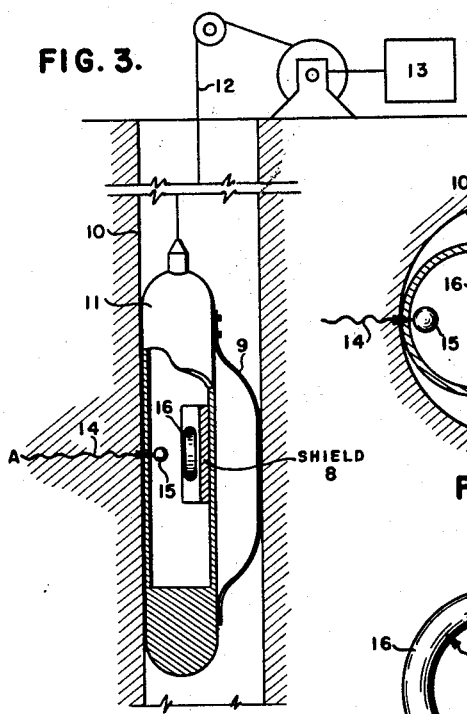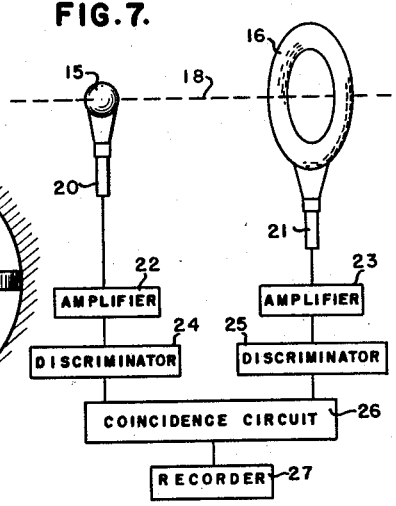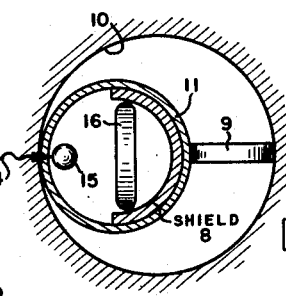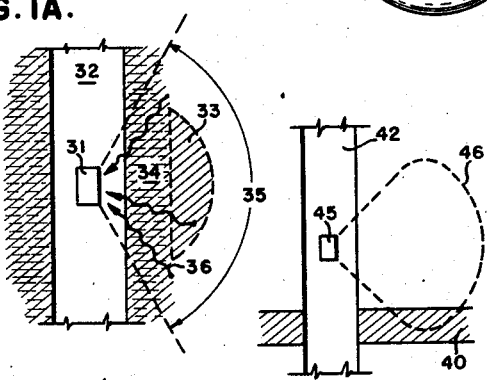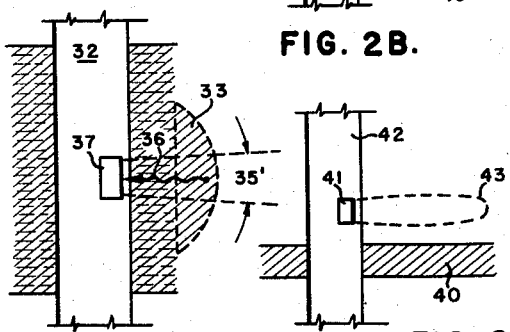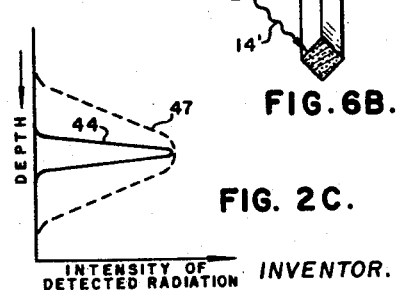

2,946,889

FOCUSING SYSTEM FOR USE IN RADIO-
ACTIVITY WELL LOGGING

Nils L. Muench, Houston, Tex., assignor, by mesne assignments, to Jersey Production Research Company, Tulsa, Okla., a corporation of Delaware Filed Apr. 15, 1957, Ser. No. 652,802

4 Claims. (Cl. 250—71.5)

This invention concerns a system for determining direction of incoming radiation for use in logging well bores.

More specifically it concerns focusing a radiation detection system utilizing multiple detectors and coincidence circuits.

It is known that various characteristics of subsurface formations can be determined by investigating the nuclear radiations emitted by these formations; these radiations being emitted either naturally or after bombardment by other nuclear radiations. In such investigations, focusing of the detector is desirable to diminish effects of drilling fluids in order to obtain data on virgin formations or to more accurately investigate narrow formations. For example, in drilled holes, the drilling fluids penetrate formations to some depth and also fill the borehole surrounding the detectors and the detector consequently investigates to a greater or lesser extent the drilling fluid rather than the formation fluids; or in investigating a particular formation, it is difficult to obtain a clear line of demarcation between the particular formation and other formations when employing an unfocused detector. To overcome these difficulties, various methods and apparatus for focusing have been employed including use of shielding materials, such as boron, cadmium, and tungsten. However, these methods have not been as effective as desired in many instances and are often totally ineffective.

Briefly, this invention comprises a system for determining direction of radiation for use in logging well bores comprising first and second scintillation detectors adapted to translate incoming gamma radiation into light, the detectors being spaced selected horizontal and vertical distances from each other, said distances selected being dependent upon the selected proportion of energy of incoming gamma rays absorbed in the first detector, the remainder of the energy of said gamma rays being absorbed in the second scintillation detector, means connected to each of the detectors for generating electrical signals in response to the light, means connected to each of said electrical signal generating means adapted to transmit electrical signals proportional to said selected gamma ray energies absorbed by said first and second scintillation detectors, respectively, and means for recording said transmitted signals only when each of said transmission means simultaneously transmit said electrical signals.

An object of this invention, therefore, is to provide an improved radiation detector focusing system for use in well logging.

This and other objects of the invention will be clear from a description of the invention taken with reference to the drawing wherein:

Figs. 1A and 1B illustrate the advantage obtained by focusing the detector in diminishing the effect of drilling fluids;

Figs. 2A, 2B and 2C illustrate the advantage obtained by focusing the detector when selectively investigating formations;

Fig. 3 is a schematic illustration of the detector positioned in a borehole according to the invention;

Fig. 4 is a plan view of the detector positioned in the borehole;

Fig. 5A is a side elevational view of the detector elements;

Fig. 5B is a front elevational view of the detector elements;

Fig. 6A is a side elevational view of another embodiment of the detector elements;

Fig. 6B is a front elevational view of another embodiment of the detector elements; and Fig. 7 is a schematic diagram of the detectors and associated electronic circuit.

To facilitate an understanding of the advantages of the invention, reference is made to Fig. 1A wherein is shown a conventional unfocused detector 31 positioned in a borehole 32 adjacent a virgin formation 33 to be investigated. As shown, drilling fluids have permeated the zone 34 surrounding borehole 32. The gamma rays, indicated by wavy lines 36, detected by detector 31 radiate from a zone designated 35. On the other hand, as shown in Fig. 1B, a focused detector 37, according to the invention, positioned in borehole 32 detects gamma radiation 36 radiating only from a relatively narrow zone designated 35'.

Thus, not only is the influence of drilling fluids surrounding the detector in the borehole eliminated, but the effect of drilling fluids which permeate the borehole wall is diminished since the zone detected has been narrowed. Additionally, as shown more clearly in Figs. 2A and 2B and 2C, a formation 40 (Figs. 2A and 2B) to be investigated is more clearly defined by employing a focused detector. When a focused detector 41 traverses a borehole 42 (Fig. 2A) the zone of the detected radiation is indicated as at 43 and the plot on intensity of radiation detected vs. depth is shown as curve 44 in Fig. 2C. However, when an unfocused detector 45 traverses borehole 42 (Fig. 2B) the zone of detected radiation is indicated as at 46 and the plot of intensity of radiation detected vs. depth is shown as curve 47 in Fig. 2C. The ability to more clearly distinguish zones is readily apparent.

For a description of the operation of the invention, reference is made to Fig. 3 wherein is shown a borehole 10 in which is positioned a detector housing 11 to which is connected an electrically conductive cable 12 by which the detector 11 may be raised and lowered in borehole 10 in order to traverse the borehole and which is adapted to transmit electrical signals generated in response to incoming radiation in the detector to an analyzing means 13 positioned on the surface of the earth. The detector 11 is shown positioned against one side of the borehole 10. Since the borehole 10 is never precisely vertical, the detector 11 may assume such positioning; however, to obtain proper orientation, springs 9 are utilized to position properly the detector against the wall of the borehole. Thus, incoming radiation 14 of most significance, as indicated by the arrowed line, will come from direction A. Two scintillation detectors 15 and 16, positioned in detector 11, are shielded from all gamma radiation originating from a direction opposite to A by shielding material 8. These detectors are formed of materials, generally known as phosphors, capable of translating short wave length incoming radiation into longer wave length radiation of the visible light range (referred to herein as light) and suitably may be crystals of sodium iodide or cesium iodide. The shield 8 may be tungsten, lead, or other heavy metals and is preferably semi-cylindrically configured as seen in Fig. 4.

The operation of this invention depends upon the absorption of incident radiation, such as gamma rays in a scintillation member by the "Compton" effect in phosphor 15, and by the photoelectric or "Compton" effect or both in phosphor 16.

Briefly, in the "Compton" scattering process, a gamma ray strikes a loosely bound or free electron and imparts some of its energy to the electron. Upon impingement of the gamma ray with the free electron, the gamma ray is scattered and the "Compton" electron is also scattered. The "Compton" effect absorption process is utilized therefore, because the incident gamma ray energy is not completely absorbed but instead leaves the gamma ray with a finite energy which is related only to the incident energy and the angle through which the gamma ray is scattered or deflected.

Phosphor 15 is spherically configured whereas phosphor 16 is formed in the shape of a solid of revolution such as a torus or doughnut (Figs. 3A and 3B). Various configurations and shapes of the phosphor 16 are within the scope of this invention. For example, the phosphor may be suitably sections of a solid of revolution 17 having straight sides (Figs. 6A and 6B) or any combination thereof.

The phosphors are arranged so that their line of centers or axes coincide as indicated by dotted line 18. Phosphor 15 is positioned adjacent the wall of the borehole and initially detects incident gamma radiation 14. The partially absorbed gamma radiation 14 is detected by phosphors 16 or 17.

As seen in Fig. 7, the phosphors 15 and 16 are optically connected to photomultiplier tubes 20 and 21, respectively, which latter are adapted to generate electrical pulses or signals proportional to the energy of the light produced in phosphors 15 and 16 in response to the gamma radiation impinging thereon. The electrical signals generated in photomultipliers 20 and 21 are then amplified in amplifiers 22 and 23, respectively, and the amplified signals are transmitted to discriminator band passes 24 and 25, respectively, which selectively pass pulses proportional to a selected energy level. From the discriminators 24 and 25 the pulses are transmitted to a coincidence electronic circuit 26 and recorder 27, which are adapted to record signals only when both of said phosphors are simultaneously affected at selected energy levels. The energy setting on the band pass discriminators 24 and 25 are adjusted according to the geometry of the phosphors and the energy of the gamma rays to be detected.

The accuracy of the focus depends primarily upon (1) geometry of the phosphors (principally size and separation) and, (2) the width of the energy band passed by the discriminators. For example, the geometry can be chosen so that 10% band width confines the beam 18 to plus or minus 10° from the axis 17 of the phosphors. The accuracy of focus will actually be slightly less than this because the gamma ray may occasionally experience two collisions in phosphor 15, or may be incompletely absorbed in phosphor 16, or may be initially scattered in phosphor 16 and then be absorbed in phosphor 15.

An example of the operation of the system follows: If a 1 mev. gamma ray is "Compton" scattered through 45°, it loses exactly 0.36 mev. (million electron volts) in the scattering process. Assume that the scintillation members or phosphors 15 and 16 are arranged and spaced such that a line drawn from phosphor 15 at an angle of 45° to the line 17 extending through the axes of the phosphors will intersect phosphor 16. A gamma ray 14 traveling in the direction shown, which is along the axes of the phosphors, must be deflected 45° after striking phosphor 15 in order to strike phosphor 16. Therefore, any gamma ray which loses 0.36 mev. in a single collision in phosphor 15 and thereafter is completely absorbed by losing 0.64 mev. in phosphor 16 must have originated in the direction A indicated by the axes through the phosphors. The discriminator 24 is set to pass only electrical pulses generated in response to 0.36 mev. gamma rays and discriminator 25 is set to pass only electrical pulses generated in response to 0.64 mev. gamma rays. Since the coincidence circuit 26 transmits signals to the recorder 27 only at this time, the direction of radiation is established.

Although not disclosed specifically the azimuthal direction could also be ascertained by proper orientation of the detector with respect to the borehole.

Having fully described the operation, elements and nature of the invention, I claim:

1. A system for focusing radiation emanating from subsurface formations surrounding a well bore comprising first and second scintillation detectors adapted to translate incoming gamma radiation into light, said detectors being spaced selected horizontal and vertical distances from each other, said distances selected being dependent upon the proportion of energy of incoming gamma rays absorbed in said first detector, the remainder of the energy of said gamma rays being absorbed in said second scintillation detector, said first scintillation detector being a spherically configured phosphor positioned adjacent the wall of the well bore, said second scintillation detector being a solid of revolution configured phosphor positioned relative to said first scintillation detector such that the axis of said solid of revolution extends in a substantially horizontal direction and coincides with an axis of said first detector, means connected to each of said detectors for generating electrical signals in response to said light, means connected to each of said electrical signal generating means adapted to transmit electrical signals proportional to selected gamma ray energies absorbed in said first and second scintillation detectors, respectively, and means for recording said transmitted signals only when the energies of said gamma rays absorbed in said first and second detectors equals said selected gamma ray energies.

2. A system as recited in claim 1 wherein said second detector is sectional.

3. A system for focusing radiation emanating from subsurface formations surrounding a well bore comprising first and second scintillation detectors adapted to translate incoming gamma radiation into light, said detectors being spaced selected horizontal and vertical distances from each other, said distances selected being dependent upon the proportion of energy of incoming gamma rays absorbed in said first detector, the remainder of the energy of said gamma rays being absorbed in said second scintillation detector, said first scintillation detector being a spherically configured phosphor positioned adjacent the well bore wall adapted to detect gamma rays originating from one direction, a shield positioned adjacent said scintillation detectors adapted to shield said scintillation detectors from gamma rays originating from a direction opposite to said one direction, said second scintillation detector being a solid of revolution configured phopshor positioned relative to said first scintillation detector such that the axis of said torus extends in a substantially horizontal direction and coincides with an axis of said first detector, means connected to each of said detectors for generating electrical signals in response to said light, means connected to each of said electrical signal generating means adapted to transmit electrical signals proportional to selected gamma ray energies absorbed in said first and second scintillation detectors, respectively, and means for recording said transmitted signals only when the energies of said gamma rays absorbed in said first and second detectors equals said selected gamma ray energies.

4. A system as recited in claim 3 wherein said second detector is sectional.

References Cited in the file of this patent

UNITED STATES PATENTS 2,830,185     Scherbatskoy             Apr. 8, 1958

OTHER REFERENCES

Hofstradter et al.: "Measurement of Gamma-Ray Energies With Two Crystals in Coincidence" (1950), Physical Review, vol. 78, pages 619–620.

Korff: "Electron and Nuclear Counters," D. Van Nostrand Co., Inc. (1955), pages 316–322.